United States Patent

Huang et al.

[11] Patent Number: 5,855,530
[45] Date of Patent: Jan. 5, 1999

[54] SPEED-CHANGING TRANSMISSION HUB FOR A BICYCLE

[75] Inventors: Yu-Ming Huang, Kaohsiung; Jung-Ping Chiang, Taipei; Caesar Chen, Taipei; Ching-Huei Wu, Taipei, all of Taiwan

[73] Assignee: Industrial Technology Research Institute, Hsinchu, Taiwan

[21] Appl. No.: 902,985

[22] Filed: Jul. 30, 1997

[51] Int. Cl.⁶ .................................................... F16H 3/56
[52] U.S. Cl. .................... 475/289; 475/288; 475/339; 475/341
[58] Field of Search .................. 475/288, 289, 475/292, 296, 297, 311, 312, 271, 339, 341

[56] References Cited

U.S. PATENT DOCUMENTS

| | | | |
|---|---|---|---|
| 4,628,769 | 12/1986 | Nagano | 475/297 |
| 4,721,013 | 1/1988 | Steur et al. | 475/289 |
| 4,838,122 | 6/1989 | Takamiya et al. | 475/289 |
| 4,854,191 | 8/1989 | Nagano | 475/289 |
| 4,973,297 | 11/1990 | Bergles | 475/289 |
| 5,078,664 | 1/1992 | Nagano | 475/296 X |
| 5,540,456 | 7/1996 | Meier-Burkamp et al. | 475/271 X |
| 5,562,563 | 10/1996 | Shoge | 475/312 |

Primary Examiner—Rodney H. Bonck
Assistant Examiner—Ankur Parekh
Attorney, Agent, or Firm—W. Wayne Liauh

[57] ABSTRACT

The present invention relates to a speed-changing transmission hub for a bicycle comprising: a central shaft; a controlling device; a planetary gear system, which comprises a planet gear holder, holding several planet gears; a second ring gear; a first ring gear; and two sun gears. Variations of speed are realized by separately fixing the sun gears of different diameters. There is no switching of input and no reversal of the rotation of the sun gears. The sun gears only need to be controlled by a one-way clutch guided by the controlling device, which is mounted on the central shaft. Thereby the arrangement is simplified and its weight is reduced.

9 Claims, 11 Drawing Sheets

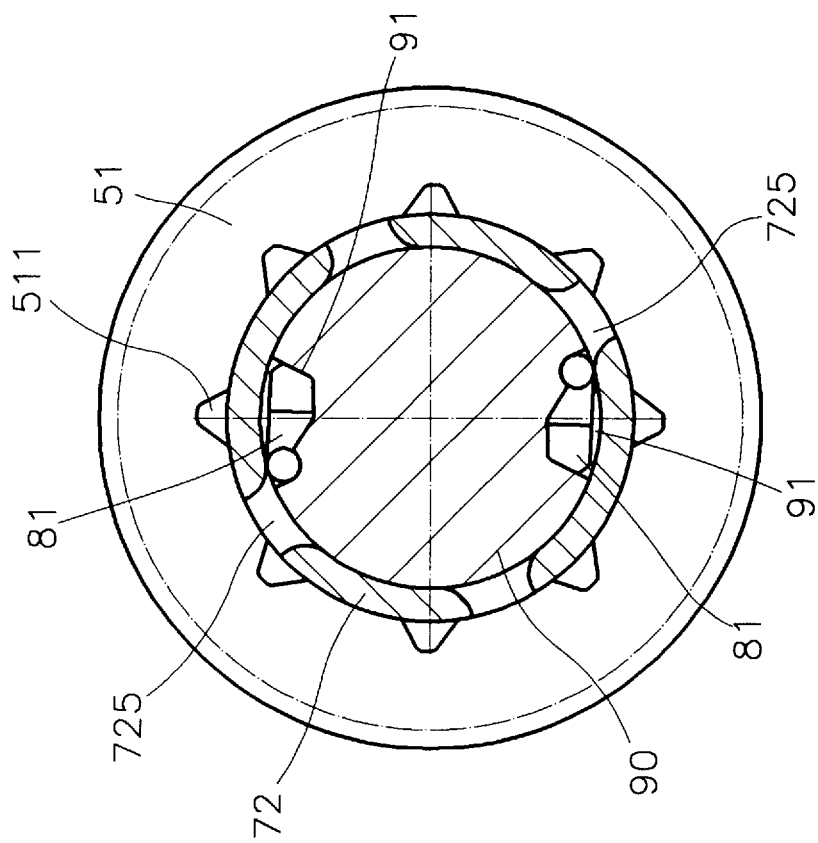
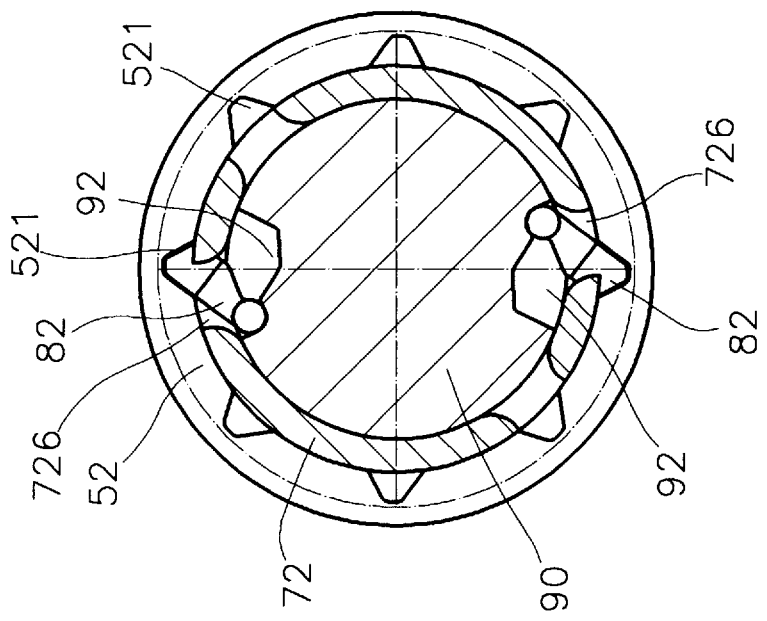

FIG 17

| structural part | 10 | | 20 | 30 | 40 | 41 | 50 | | 60 |
|---|---|---|---|---|---|---|---|---|---|
| | 11 | 12 | | | | | 51 | 52 | |
| first gear | O | | O | | O | O | | | O |
| second gear | O | | O | | O | O | O | | O |
| third gear | | O | | | O | | | | O |
| fourth gear | O | | O | O | | O | O | | O |
| fifth gear | O | | O | O | | O | | O | O |

| pawl or catch | 13 | 81 | 82 | 42 | 62 | 63 |
|---|---|---|---|---|---|---|
| first gear | — | ◯ | × | ◯ | — | ◯ |
| second gear | — | × | ◯ | ◯ | — | ◯ |
| third gear | + | × | × | ◯ | — | ◯ |
| fourth gear | — | × | ◯ | — | × | ◯ |
| fifth gear | — | ◯ | × | — | × | ◯ |

FIG 18

SPEED-CHANGING TRANSMISSION HUB FOR A BICYCLE

BACKGROUND OF THE INVENTION

1. Field of the Invention

The present invention relates to a speed-changing transmission hub for a bicycle, particularly to a speed-changing transmission hub for a bicycle, which does not require switching the torque input and has a group of one-way clutches for controlling the fixing of the sun gear group.

2. Description of Related Art

A conventional speed-changing transmission hub uses a planetary gear train comprising a ring gear, planet gears and sun gears. Torque is inputted to the planetary gear train either via the ring gear or the carrier, as controlled by a clutch, which engages either with the ring gear or with the carrier, thus controlling the path of torque within the planetary gear train and the degrees of freedom of the sun gears for various speeds. Depending on the characteristics of the planetary gear train, the tendency of the rotation of the sun gears is connected to which of the gears of the planetary gear train is active. Different torque inputs (by the ring gear or by the carrier) lead to different tendency of the rotation of the sun gears. If the carrier is driving, the sun gears rotate the same way as the carrier. If the ring gear is driving, the sun gears and the ring gear rotate the opposite way. U.S. Pat. No. 5,078,664 discloses a device for controlling the degree of freedom of the sun gears, wherein fixing each sun gear is controlled by two one-way clutches working in different directions. This arrangement, however, is complicated.

In order to resolve this problem, U.S. Pat. No. 5,273,500 discloses a two-stage planetary gear train with a common carrier. Therein, each sun gear is provided with a single one-way clutch, which is sufficient to control its rotation. However, since more than one sun gear and ring gear are needed, the system becomes weighty and complicated.

SUMMARY OF THE INVENTION

It is therefore an object of the present invention to provide a speed-changing transmission hub for a bicycle, which simplifies controlling the rotation of the sun gear.

Another object of the present invention is to provide a speed-changing transmission hub for a bicycle, which allows for simplified switching of the power input.

A further object of the present invention is to provide a speed-changing transmission hub for a bicycle, which has a small volume.

A further object of the present invention is to provide a speed-changing transmission hub for a bicycle which has reduced weight.

The present invention can be more fully understood by reference to the following description and accompanying drawings.

BRIEF DESCRIPTION OF THE DRAWINGS

FIG. 9 is a schematic illustration of the position of the second pawl in the second gear.

FIG. 10 is a schematic illustration of the position of the first pawl in the second gear.

FIG. 17 is a table of the transmission flow in all gears in the present invention.

FIG. 18 is a table of the use of the pawls in all gears in the present invention.

DETAILED DESCRIPTION OF THE PREFERRED EMBODIMENT

Figure 1:
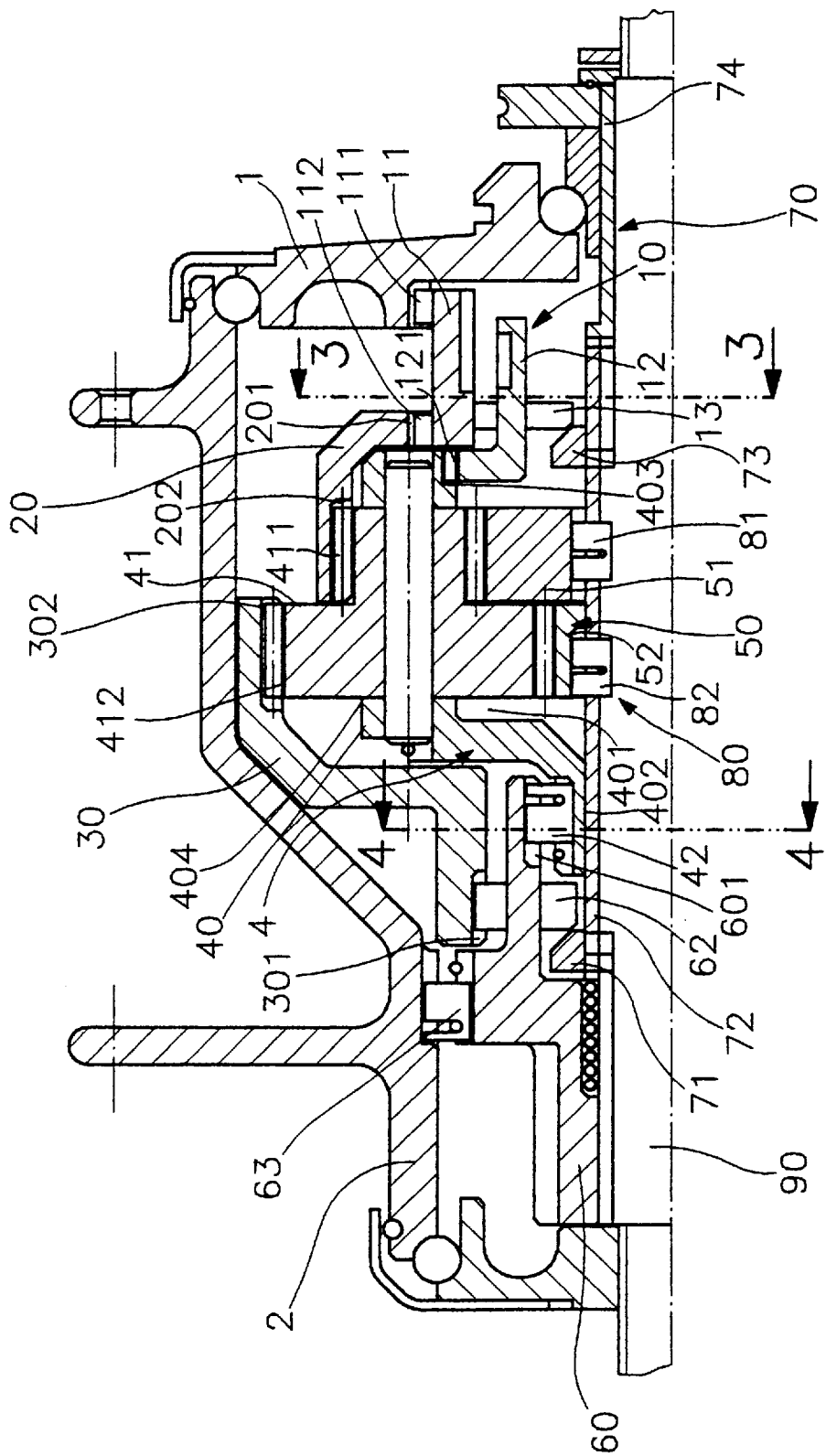
FIG. 1 is a sectional view of the present invention, showing the assembly of the structural parts.

The speed-changing transmission hub for a bicycle of the present invention has a driving unit 1; a hub 2, which is finally driven; a planetary gear system 4, which comprises a carrier 40, holding several planet gears 41; a second ring gear 30; a first ring gear 20; and a sun gear group 50. When the driving unit 1 drives a transmission unit 10, the rotation is directly transmitted to the first ring gear 20, undergoes a change of velocity by the planetary gear systems 4, and is by the second ring gear 30 or the carrier 40 further transmitted to an output unit 60 and from there finally to the hub 2. Only the first ring gear 20 is used as input of the rotation. There is no switching of input and no reversal of the rotation of the sun gear group 50. The sun gear group 50 only needs to be controlled by a one-way clutch group 80 guided by a controlling device 70, mounted on a central shaft 90. Thereby the arrangement is simplified and its weight is reduced.

Figure 2:
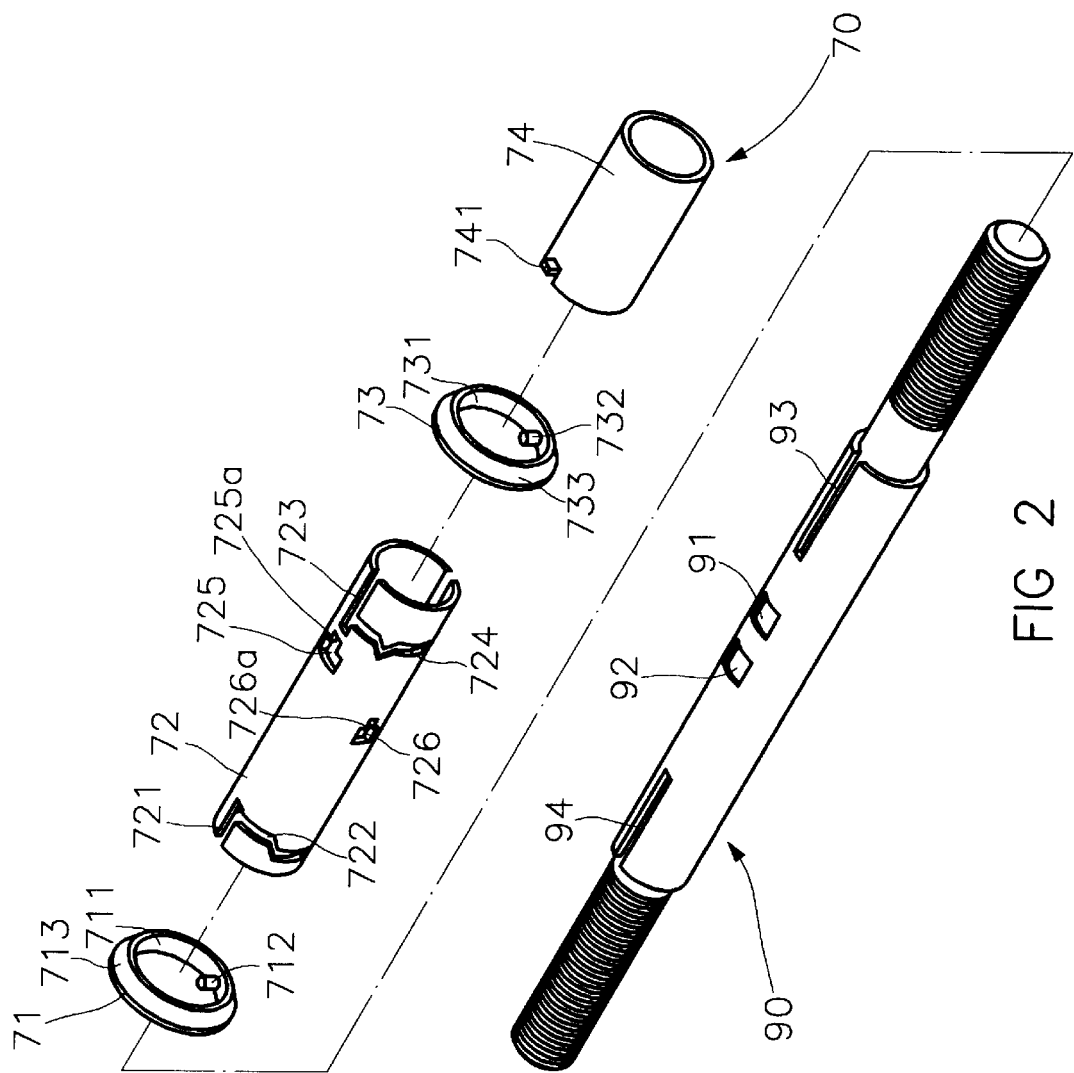
FIG. 2 is a perspective exploded view of the fixing shaft and the control system of the present invention.

Referring to FIGS. 1 and 2, the central shaft 90 is an elongated body fixed to the hub 2, having a front end, a rear end and a longitudinal axis, which is the common rotational axis of the planetary gear system 4. On the periphery of the central shaft 90, in its middle section, a first accommodating hole 91 and a second accommodating hole 92 are cut. The first and second accommodating holes 91, 92 have a certain distance to each other and accommodate the one-way clutch group 80. Towards the front end of the central shaft 90, a longitudinal front groove 93 is cut into the periphery thereof, and towards the rear end of the central shaft 90, a longitudinal rear groove 94 is cut into the periphery thereof. The front groove 93 and the rear groove 94 hold the controlling device 70.

As shown in FIGS. 1 to 4, the controlling device 70 mainly comprises a first ring 71, a tube 72, a second ring 73, and a controlling element 74. The first ring 71 has an inner opening 711, the diameter of which is larger than the outer diameter of the tube 72. The periphery of the first ring 71 is partly formed by an oblique part 713 shaped like a shallow truncated cone. From the inner perimeter of the first ring 71, a protrusion 712 points inwards, fitting into the rear groove 94 of the central shaft 90, allowing the first ring 71 to be put over the tube 72 and to glide along the central shaft 90.

The tube 72 is a tubular body of suitable length, rotatably put over the central shaft 90. From the rear end of the tube 72, a first longitudinal groove 721 is cut into the periphery thereof. The first longitudinal groove 721 continues on its front end as a first transverse groove 722, which is cut as a zigzag curve into the periphery of the tube 72. The first longitudinal and transverse grooves 721, 722 accommodate the protrusion 712 of the first ring 71, when the first ring 71 is put over the tube 72. Any rotation of the tube 72 against the first ring 71 is by the first transverse groove 722 transformed into a longitudinal movement of the first ring 71 on the tube 72 for controlling the output unit 60 (further explained below). Similarly, from the front end of the tube 72, a second longitudinal groove 723 is cut into the periphery thereof. The second longitudinal groove 723 continues on its rear end as a second transverse groove 724, which is cut as a zigzag curve into the periphery of the tube 72 for inserting the second ring 73 and the controlling element 74.

The second ring 73 and the controlling element 74 are connected to the tube 72 from the front end thereof. The second ring 73 has, similarly to the first ring 71, an inner opening 731, a protrusion 732 and an oblique part 733. The second ring 73 is put over the front end of the tube 72, its protrusion 732 entering the second longitudinal and transverse grooves 723, 724 and the longitudinal front groove 93 for controlling the transmission of the transmission unit 10 (further explained below). The controlling element 74 has a tubular shape. A user controls the angular position of the controlling element 74. The controlling element is put over the front end of the central shaft 90. From the periphery of the controlling element 74 a protrusion 741 extends outward, entering the second longitudinal groove of the tube 72, taking the tube 72 along with a rotation of the controlling element 74 and causing the first and second rings 71, 73 to glide in the first and second longitudinal grooves 93, 94, respectively.

As shown in FIGS. 2 and 6 to 8, a first opening 725 and a second opening 726 are cut into the periphery of the tube 72 at different angular positions, their longitudinal positions corresponding to the first and second accommodating holes 91, 92. The first and second openings 725, 726 are shaped like the letter T with narrow parts that point to the front end of the tube 72 and wide parts, which are wider than the length of the one-way clutch group 80. The first and second openings 725, 726 have curved walls 725a, 726a, the distance of which increases towards the inner periphery of the tube 72. The one-way clutch group 80 extends outward into the openings 725, 726 or retreats into the accommodating openings 91, 92, as controlled by the walls 725a, 726a.

Referring to FIGS. 1 and 5 to 8, the one-way clutch group 80 comprises a first clutch 81 and a second clutch 82. The first clutch 81 is inserted in the first accommodating hole 91. The first clutch 81 comprises a catch 811, a flat section 813 and an extension 812, all arranged along and being turnable around an axis parallel to the longitudinal axis. A spring (not shown) tends to turn the first clutch 81 outward to let the catch 811 stick out of the accommodating hole 91, corresponding to the tube 72. When the first opening 725 covers the accommodating hole 91, the extension 812 and the flat part 813 are next to the narrow part of the opening 725, with the flat part 813 close to both sides of the wall 725a, and the catch 811 reaches into the wide part of the first opening 725, beyond the outer perimeter of the tube 72. By turning the tube 72 against the central shaft 90, the wall 725a pushes against the flat part 813, turning the first clutch 81 inwards, such that the catch 811 vanishes in the accommodating hole 91. In the same way, the second clutch 82 is inserted in the second accommodating hole 92, comprising a catch 821, a flat section 823 and an extension 822 and working like the first clutch 81. Thus, by turning the tube 72 against the central shaft 90, engaging the sun gear group 50 is controlled.

Figure 8:
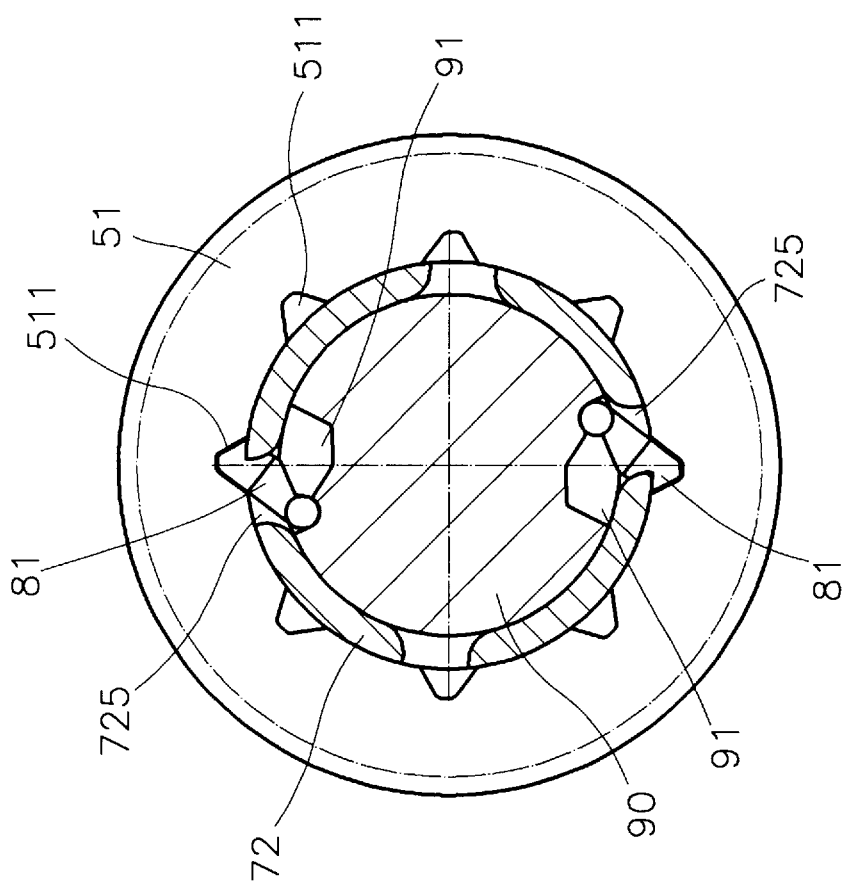
FIG. 8 is a schematic illustration of the position of the first pawl in the first gear.
Figure 7:
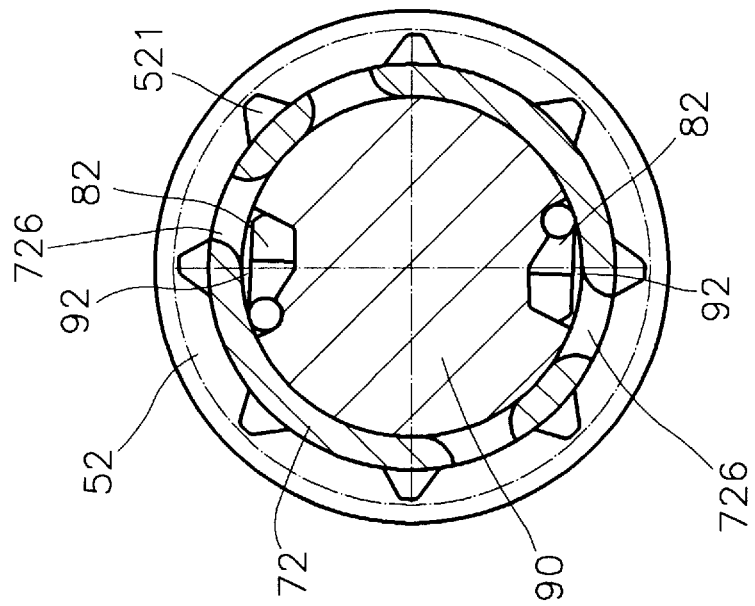
FIG. 7 is a schematic illustration of the position of the second pawl in the first gear.
Figure 12:
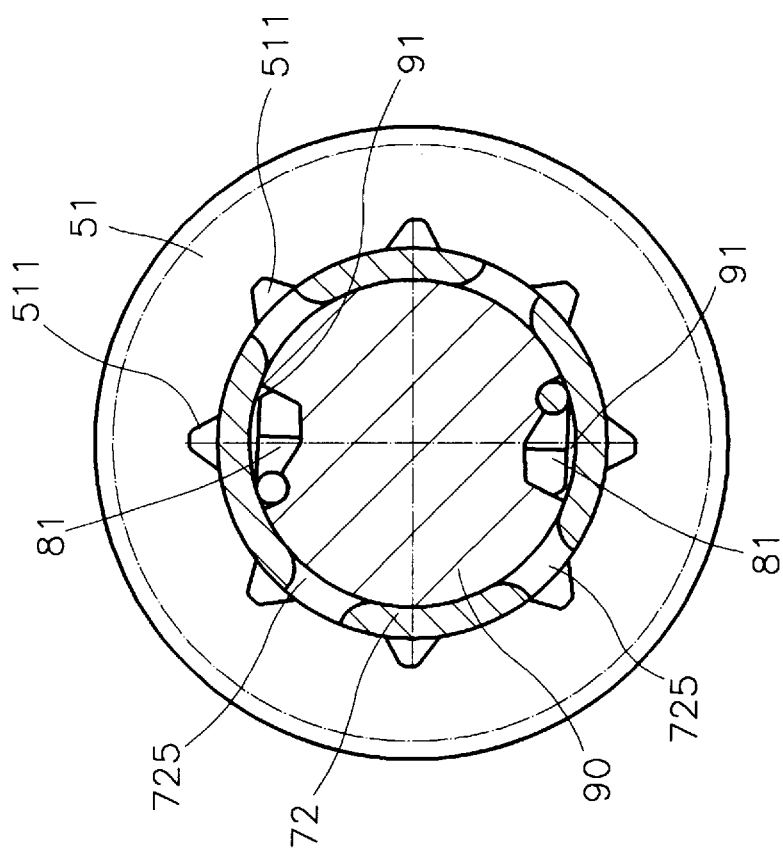
FIG. 12 is a schematic illustration of the position of the first pawl in the third gear.
Figure 11:
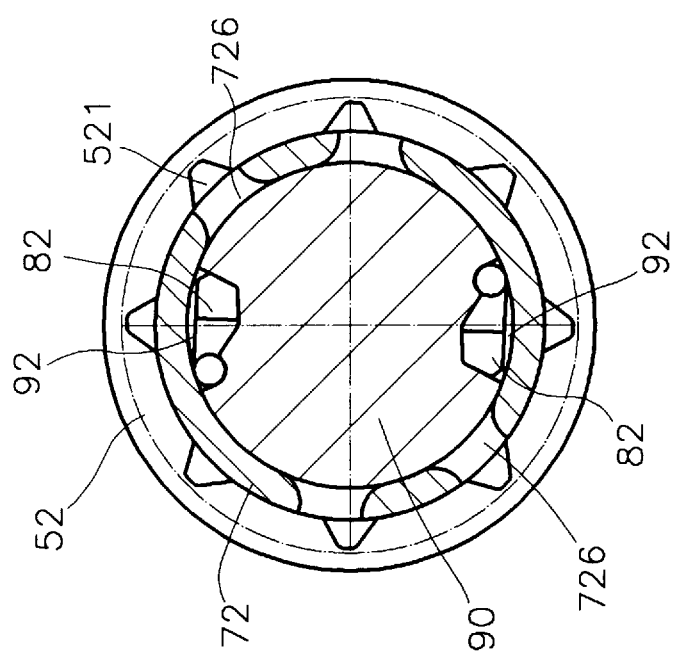
FIG. 11 is a schematic illustration of the position of the second pawl in the third gear.
Figure 14:
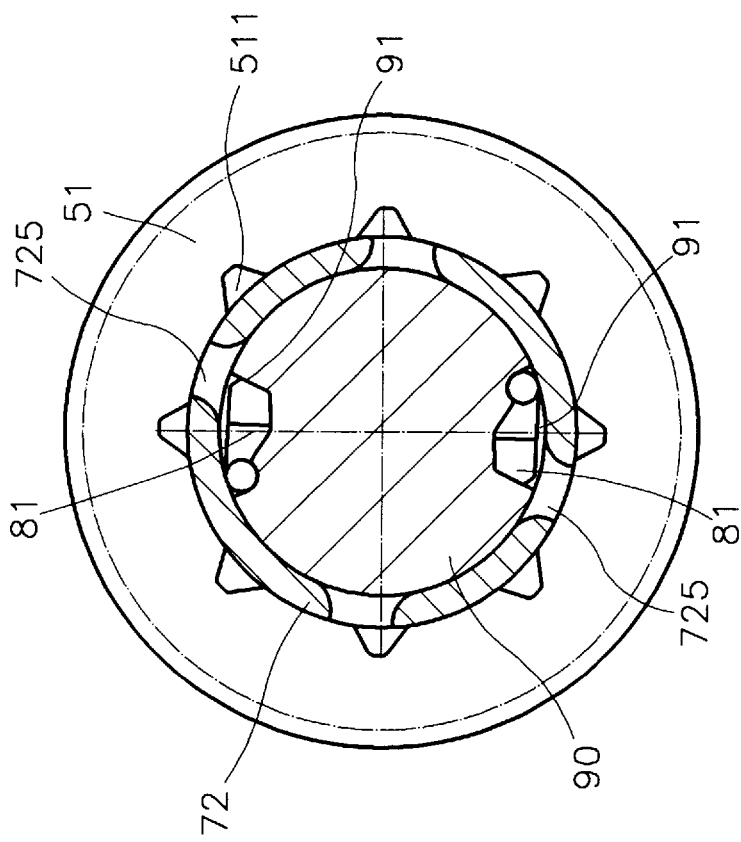
FIG. 14 is a schematic illustration of the position of the first pawl in the fourth gear.
Figure 13:
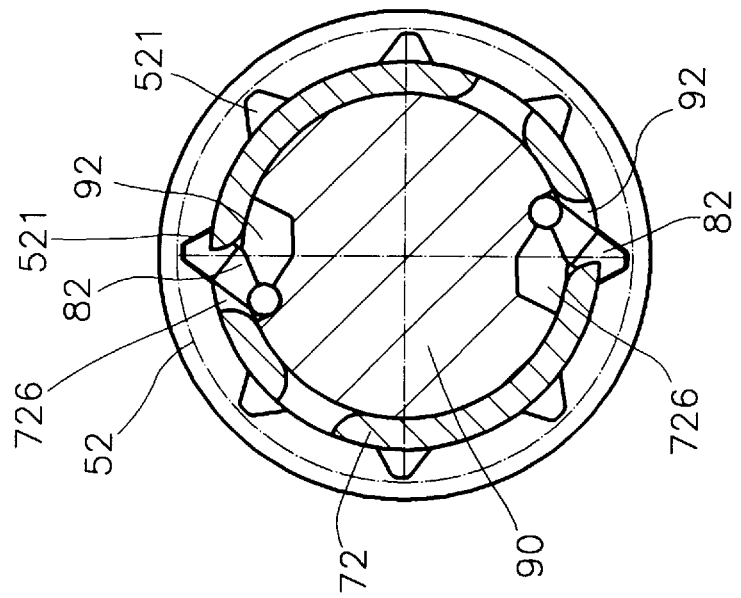
FIG. 13 is a schematic illustration of the position of the second pawl in the fourth gear.
Figure 16:
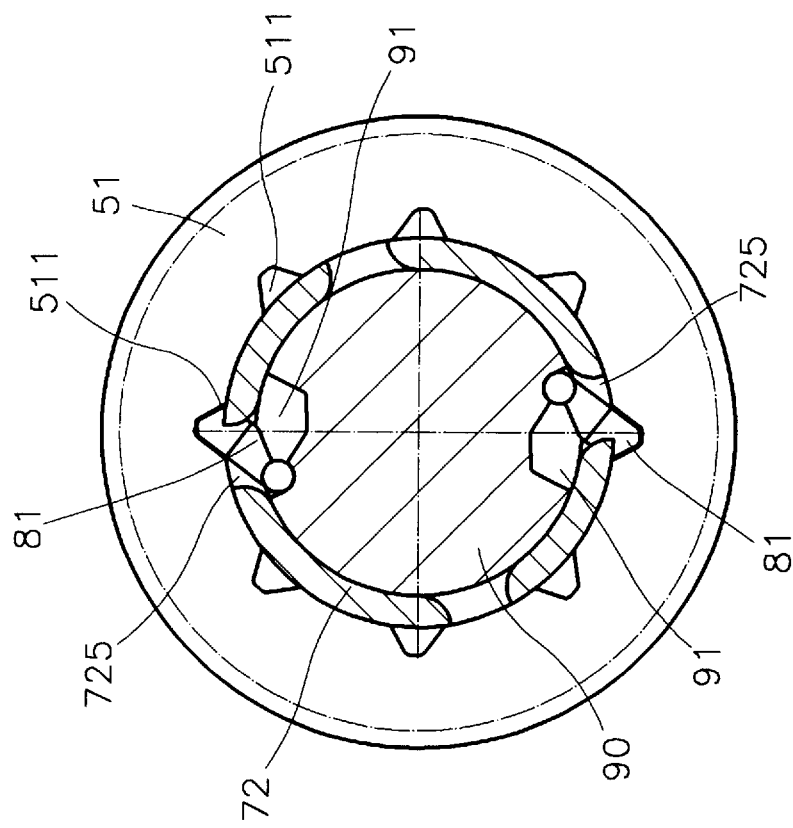
FIG. 16 is a schematic illustration of the position of the first pawl in the fifth gear.
Figure 15:
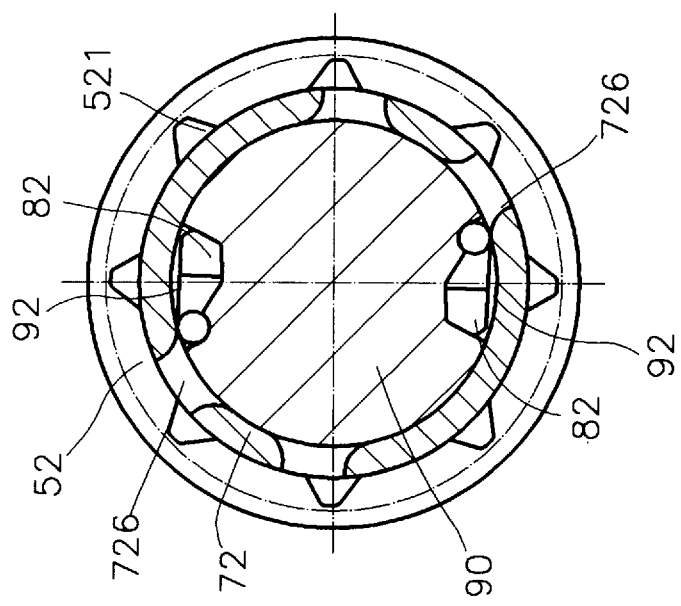
FIG. 15 is a schematic illustration of the position of the second pawl in the fifth gear.

Referring to FIGS. 1, 7 and 8, the sun gear group 50 comprises a first sun gear 51 and a second sun gear 52, with the first sun gear 51 having a larger diameter than the second sun gear 52. The first and second sun gears 51, 52 surround the tube 72, their axes coinciding with the longitudinal axis and their longitudinal positions corresponding to the first and second pawls 81, 82, respectively. The inner perimeter of the first sun gear 51 has incisions 511 for engaging with the first clutch 81, and the inner perimeter of the second sun gear 52 has incisions 521 for engaging with the second clutch 82. Thus the first and second sun gears 51, 52 are separately fixable to the central shaft 90 or rotatable against it, depending on the angular position of the tube 72, so as to switch gears.

As shown in FIG. 1, several planet gears 41 surround the sun gear group 50, mounted on the carrier 40. The carrier 40 is roughly shaped like a pan with an axis coinciding with the longitudinal axis, having a large opening 401 to the front and a small opening 402 to the rear. The large opening 401 has a diameter larger than the diameter of the sun gear group 50 and surrounds the sun gear group 50. The small opening 402 is located close to the rear end of the tube 72. The front end of the periphery of the large opening 401 has several pawls 403, which engage with the transmission unit 10. The periphery of the large opening 401 further has several openings 404 for accommodating the planet gears 41. The rear end of the carrier 40 has pawls 42 for engaging with the output unit 60 and transmitting torque to the output unit 60.

Figure 4:
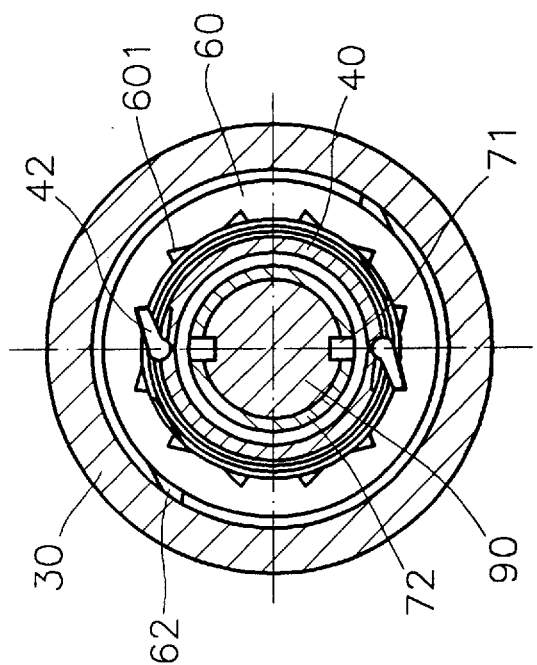
FIG. 4 is a cross-sectional view taken along line B—B of FIG. 1, showing the relation between the output unit and the carrier.

Referring to FIGS. 1 and 4, the output unit 60 surrounds the rear end of the tube with an axis coinciding with the longitudinal axis, having several incisions 601 on its inner periphery for engaging with the pawls 42, so as to be driven by the carrier 40. The output unit 60 further has pawls 63 that engage with the hub 2 for driving the hub 2. Moreover, a pawl 62 is mounted on the output unit 60 for engaging with the second ring gear 30 at a longitudinal position close to the first ring 71. A spring (not shown) keeps the pawl 62 engaged with the second ring gear 30, causing the output unit 60 to be driven by the second ring gear 30. However, when the first ring 71 moves longitudinally towards the pawl 62, as driven by a rotational movement of the tube 72, the oblique part 713 causes the pawl 62 to disengage from the second ring gear 30.

The second ring gear 30 is roughly shaped like a pan, surrounding the output unit 60 and the carrier 40, having an axis which coincides with the longitudinal axis. The inner periphery of the second ring gear 30 close to the front end thereof has teeth 302, which engage with the teeth of the planet gears 41. The inner periphery of the second ring gear 30 close to the rear end thereof has incisions 301 for engaging with the pawl 62 on the output unit 60. When the incisions 301 engage with the pawl 62, the second ring gear 30 transmits torque from the planet gears 41 to the output unit 60.

Referring to FIG. 1, each planet gear 41 has a first gear portion 411 and a second gear portion 412, which both are mounted on a common axis in one of the openings 404 of the carrier 40. The second gear portion 412 of each planet gear 41 engages with the second sun gear 52 and with the teeth 302 of the second ring gear 30. The first gear portion 411 of each planet gear 41 engages with the first sun gear 51 and with the first ring gear 20.

The first ring gear 20 is roughly shaped like a pan, surrounding the first gear portions 411 of the planet gears 41, having an axis which coincides with the longitudinal axis. The inner periphery of the first ring gear 20 close to the rear end thereof has teeth 202, which engage with the first gear portions 411 of the planet gears 41. The inner periphery of the first ring gear 20 close to the rear end thereof has incisions 201 for engaging with the transmission unit 10, so as to drive the first ring gear 20 by the transmission unit 10.

Figure 3:
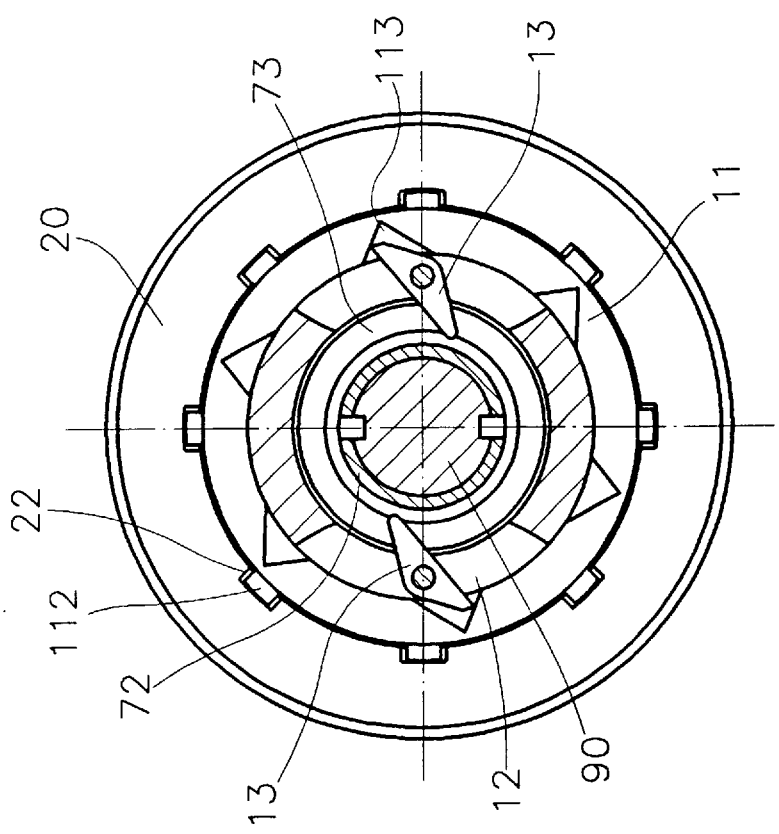
FIG. 3 is a cross-sectional view taken along line A—A of FIG. 1, showing the relation between the first transmission unit and the second transmission unit.
Figure 5:
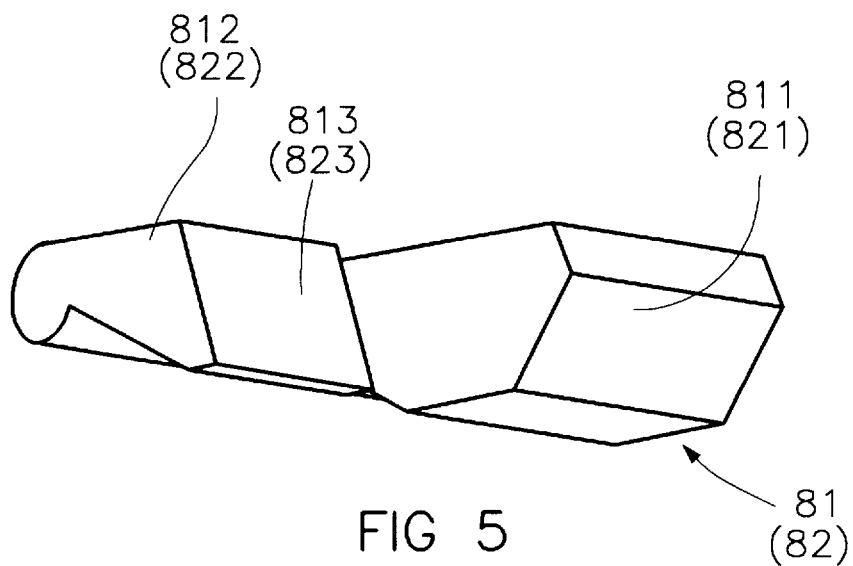
FIG. 5 is a perspective view of the one-way clutch of the present invention.
Figure 6:
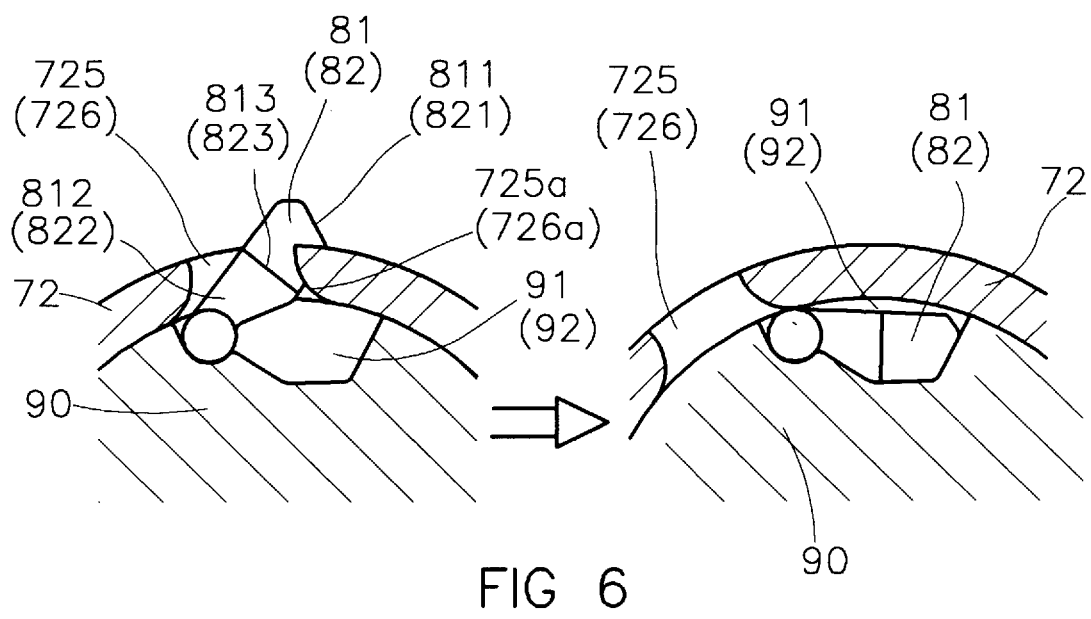
FIG. 6 is a schematic illustration of the working of the one-way clutch of the present invention.

Referring to FIGS. 1 and 3, the transmission unit 10 is directly driven by the driving unit 1. The axis of the transmission unit 10 coincides with the longitudinal axis. The transmission unit 10 comprises a first transmission unit 11 and a second transmission unit 12. The second transmission unit 12 has incisions 121, which engage with the pawls 403 of the carrier 40. The first transmission unit 11 has, on the front end of its outer periphery, pawls 111, which engage with the driving unit 1 and, on the rear end of its outer periphery, pawls 112, which engage with the incisions 201 of the first ring gear 20. Thereby the first ring gear 20 is driven by the driving unit 1. The planet gears 41, the sun gear group 50, the carrier 40 and the output unit 60 further transmit torque to the hub 2.

The first transmission unit 11 has several incisions 113 on its inner periphery for engaging with pawls 13 on the outer periphery of the second transmission unit 12 at a longitudinal position close to the second ring 73. A spring urges the pawls 13 to engage with the incisions 113. However, when the second ring 73 moves longitudinally towards the pawls 13, as driven by a rotational movement of the tube 72, the oblique part 733 causes the pawls 13 to disengage from the incisions 113, such that the second transmission unit 12 rotates freely within the first transmission unit 11. When the second ring 73 moves away from the pawls 13, as driven by a rotational movement of the tube 72, the pawls 13 engage with the first transmission unit 11, causing the driving unit 1, by having the first transmission unit 11 drive the second transmission unit 12, to drive the carrier 40 directly and from there the output unit 60, thus realizing another driving mode.

The speed-changing transmission hub for a bicycle of the present invention operates at five speeds, as shown in FIGS. 7–17. Various flows of the transmission of torque are realized by engaging and disengaging pawls, as shown in FIG. 18, where "O" denotes blocking, "+" denotes forced blocking, "–" denotes disengaging, and "X" denotes forced disengaging. The transmission flow in each gear is as follows:

In the first gear, the tube 72 is turned to have the first clutch 81 fix the first sun gear 51. The first ring 71 and the second ring 73 are positioned to disengage the pawl 62 and the pawls 13. Then torque is transmitted via the first transmission unit 11 and the first ring gear 20, turning the planet gears 41 against the first sun gear 51, rotating the carrier 40 and, with the pawls 42 engaging, the output unit 60. Finally, torque is via the pawls 63 transmitted to the hub 2.

In the second gear, the tube 72 is turned to have the second clutch 82 fix the second sun gear 52. The first ring 71 and the second ring 73 are positioned to disengage the pawl 62 and the pawls 13. Then torque is transmitted via the first transmission unit 11 and the first ring gear 20, turning the planet gears 41 against the second sun gear 52, rotating the carrier 40 and, with the pawls 42 engaging, the output unit 60. Finally, torque is via the pawls 63 transmitted to the hub 2.

In the third gear, the tube 72 is turned to have the first and second pawls 81, 82 release the first and second sun gears 51, 52. The first ring 71 is positioned to disengage the pawl 62. The second ring 73 is moved to engage the pawls 13 with the incisions 113. Then the second transmission unit 12 rotates along with the first transmission unit 11, and torque is transmitted via the second transmission unit 12 and the carrier 40 directly to the output unit 60. At that time, no torque is transmitted by the planet gears 41 and the sun gear group 50. Finally, torque is via the pawls 63 transmitted to the hub 2.

In the fourth gear, the tube 72 is turned to have the second clutch 82 fix the second sun gear 52. The first ring 71 is moved to engage the pawl 62 with the second ring gear 30. The second ring 73 is moved to disengage the pawls 13. Then torque is transmitted via the first transmission unit 11 and the first ring gear 20, turning the planet gears 41 against the second sun gear 52, rotating the second ring gear 30 and, with the pawls 62 engaging, the output unit 60. Finally, torque is via the pawls 63 transmitted to the hub 2.

In the fifth gear, the tube 72 is turned to have the first clutch 81 fix the first sun gear 51. The first ring 71 is positioned to engage the pawl 62 with the second ring gear 30. The second ring 73 is positioned to disengage the pawls 13. Then torque is transmitted via the first transmission unit 11 and the first ring gear 20, turning the planet gears 41 against the first sun gear 51, rotating the second ring gear 30 and, with the pawls 62 engaging, the output unit 60. Finally, torque is via the pawls 63 transmitted to the hub 2.

Looking at the cooperation of the structural parts of the speed-changing transmission hub for a bicycle of the present invention it can be seen that the planet gears 41 take the input only from the first ring gear 20. When the sun gear group 50 is fixed, the tendency of the rotation is unchanged. Therefore it is sufficient to control the fixing of the two sun gears 51, 52 of the sun gear system 50 by a group of clutches working in the same direction. This not only simplifies the control of the fixing of the sun gear group 50, but also reduces volume and weight. The present invention is not only suitable for five gears, but is also extendable to more gears by simply adding sun gears and planet gears in a suitable way.

While the invention has been described with reference to a preferred embodiment thereof, it is to be understood that modifications or variations may be easily made without departing from the spirit of this invention which is defined by the appended claims.

What is claimed is:

1. A speed-changing transmission hub for a bicycle, comprising:
   a central shaft, with an axis that defines a longitudinal axis with a front end and a rear end, having a periphery, into which two accommodating holes are cut at two longitudinal positions;
   a controlling device with a front end and a rear end, surrounding said central shaft, further comprising
      a controlling element on said front end with an angular position controlled by a user, and
      a tube with a front end, a rear end and a periphery, having an angular position that follows said angular position of said controlling element, with two openings cut into said periphery of said tube at said two longitudinal positions of said two accommodating holes;

a one-way clutch group, comprising two clutches, which are inserted into said two accommodating holes, each of said two clutches either outward protruding through one of said openings of said tube beyond said periphery thereof, or by said tube held back in one of said accommodating holes;

two sun gears, surrounding said tube at said two longitudinal positions of said two accommodating holes, having a rotational axis coinciding with said longitudinal axis, separately rotatable against said tube and separately engaging or disengaging with said two clutches, as controlled by said angular position of said tube;

a planet gear system, further comprising
a carrier, having a large opening with a periphery, surrounding said two sun gears, having an axis coinciding with said longitudinal axis, rotatably mounted on said tube close to said rear end thereof, with several openings in said periphery of said large opening, and several planet gears, rotatably mounted in said openings of said carrier, each of said planet gears a first gear portion and a second gear portion, which engage with said two sun gears, respectively, revolving around said sun gears;

a first ring gear, having an axis coinciding with said longitudinal axis, engaging with said planet gears;

a first transmission unit for transmitting input torque to said first ring gear; and an output unit, surrounding said rear end of said tube, for transmitting torque from said carrier to an output hub;

wherein said planet gears are driven only by said first ring gear, with each of said two sun gears being either fixed or rotating the same way, and gears are switched by separately fixing and releasing said two sun gears using said one-way clutch group, as controlled by said angular position of said tube.

2. A speed-changing transmission hub for a bicycle according to claim 1, having a second transmission unit taken along by said first transmission unit and engaging with a pawl, which is mounted on said carrier close to said large opening, for directly driving said carrier.

3. A speed-changing transmission hub for a bicycle according to claim 2, wherein said first transmission unit and said second transmission unit rotate around said longitudinal axis.

4. A speed-changing transmission hub for a bicycle according to claim 3, wherein said first transmission unit and said second transmission unit are further provided with an engaging system for linking said second transmission unit to said first transmission unit or allowing said second transmission unit to rotate freely.

5. A speed-changing transmission hub for a bicycle according to claim 4, wherein said engaging system is controlled by a second ring, which is mounted on said controlling device for linking said second transmission unit to said first transmission unit or allowing said second transmission unit to rotate freely.

6. A speed-changing transmission hub for a bicycle according to claim 1, having a second ring gear with a front end and a rear end, said second ring gear on said front end engaging with said planet gears and on said rear end engaging with said output unit for transmitting torque to said output unit.

7. A speed-changing transmission hub for a bicycle according to claim 6, wherein pawls are mounted on said output unit for engaging with said second ring gear.

8. A speed-changing transmission hub for a bicycle according to claim 7, wherein said pawls are controlled by a first ring, which is mounted on said controlling device for linking said second ring gear to said output unit or allowing said second ring gear to rotate freely.

9. A speed-changing transmission hub for a bicycle according to claim 1, wherein each of said two openings of said controlling device is shaped like the letter T with a narrow part and a wide part, said narrow part having curved walls; and wherein each of said two clutches comprises a pawl, a flat section and an extension, arranged along and being turnable around an axis parallel to the longitudinal axis, such that, by rotating said tube against said central shaft, one of said openings allows said pawl to protrude outward through said wide part, while said flat part is close to said walls, and by rotating said tube again against said central shaft, said walls push against said flat part, causing said pawl to return into one of said accommodating holes.

* * * * *